(12) United States Patent
van Nee

(10) Patent No.: US 7,099,269 B2
(45) Date of Patent: Aug. 29, 2006

(54) METHODS AND APPARATUS FOR GENERATING AND UTILIZING TRAINING CODES IN A SPACE DIVISION MULTIPLEXING COMMUNICATION SYSTEM

(75) Inventor: Didier Johannes R. van Nee, De Meern (NL)

(73) Assignee: Agere Systems Inc., Allentown, PA (US)

( * ) Notice: Subject to any disclaimer, the term of this patent is extended or adjusted under 35 U.S.C. 154(b) by 938 days.

(21) Appl. No.: 10/006,900

(22) Filed: Nov. 13, 2001

(65) Prior Publication Data

US 2002/0118635 A1    Aug. 29, 2002

(30) Foreign Application Priority Data

Nov. 13, 2000    (EP) ................... 00310085

(51) Int. Cl.
*H04J 11/00* (2006.01)
(52) U.S. Cl. ............... 370/208; 375/231; 375/299
(58) Field of Classification Search ............. 370/209, 370/515; 375/299
See application file for complete search history.

(56) References Cited

U.S. PATENT DOCUMENTS 5,450,456 A * 9/1995 Mueller ................. 375/224
5,790,598 A * 8/1998 Moreland et al. ......... 375/233
6,473,467 B1 * 10/2002 Wallace et al. ........... 375/267
6,804,307 B1 * 10/2004 Popovi .................. 375/299

FOREIGN PATENT DOCUMENTS

EP    0396101    11/1990
EP    1047218    10/2000

OTHER PUBLICATIONS

European Search dated May 18, 2001.
Haradah et al., "Parallel Transmission Scheme Using Cyclic Modified M-Sequence CDM For Broadband Mobile Communications", publication date of Jun. 8, 1997, pp. 929-933.

* cited by examiner

*Primary Examiner*—Chau Nguyen
*Assistant Examiner*—Jordan Hamann

(57) ABSTRACT

A communication system is disclosed that comprises first and second communication apparatus. The first communication apparatus is provided with a transmitter for each of the transmission paths, which are capable of sending at least part of a communication signal to the second communication apparatus. The first communication apparatus moreover comprises training mechanisms for generating a training code to be sent to the second communication apparatus enabling a receiver to match a received signal to a corresponding transmitted signal. According to the invention, a training code is used with at least nearly ideal cyclic auto-correlation properties such that its cyclic auto-correction function is at least nearly zero for all cyclic shifts. The transmitter concurrently sends a training code in a mutually shifted manner, while the receiver is capable of performing a cyclic auto-correlation with respect to a received training signal.

9 Claims, 3 Drawing Sheets

METHODS AND APPARATUS FOR GENERATING AND UTILIZING TRAINING CODES IN A SPACE DIVISION MULTIPLEXING COMMUNICATION SYSTEM

CROSS-REFERENCE TO RELATED APPLICATION

This application claims priority of European Patent Application No. 00310085.6, which was filed on Nov. 13, 2000.

BACKGROUND OF THE INVENTION

Communication systems, especially of a non-wired type, share a common faith in that they have to cope with the available bandwidth over the transmission path used. Numerous techniques have been developed through the years to utilize the available bandwidth as efficient as possible in order to enhance the bit rate over the transmission path. One of these techniques is so called space division multiplexing (SDM) by which a communication signal is fed and divided over a number of separate transmission paths in parallel. The communication means of the type described in the opening paragraph employ this technique and for that purpose are equipped with transmission and reception means for every transmission path which is used for the exchange of the communication signal.

A problem encountered with SDM in a non-wired environment is that the signals sent by the different transmitters are likely to interfere with each other such that each receiver not only receives a signal from the associated transmitter but also from the other transmitters. In a simple case of two transmitters and two receivers the signals $r_1$ and $r_2$ received by the two receivers may be represented as follows:

$$r_1 = h_1 \cdot x_1 + h_2 \cdot x_2$$
$$r_2 = h_3 \cdot x_1 + h_4 \cdot x_2$$

where $x_1$ and $x_2$ are the signals sent by both transmitters and $h_{1..4}$ are still unknown constants representing distortion and attenuation factors as well as other environmental and atmospheric influences exerted on the transmitted signals during transport. More generally this may be represented as: $r_i = H_i \cdot x_i$, where $H_i$ is the appropriate column of a n-dimensional matrix containing the constants $h_j$, said dimension n being equal to the number of transmission paths used. If these constants are known, the system will be able to satisfactorily decode the signals received by the receivers and to derive the original signals $x_i$ out of them. Accordingly it is necessary to teach the system these factors before information is being sent. To this end the system is provided with training means which are capable of issuing known training codes which are packed into one or more training symbols which precede the information to be sent. Based on these training codes, the reception means will be able to calculate the constants $h_j$ and to apply these constants to the information which follows.

A straightforward training scheme would be to use a predetermined training symbol and to send at least one such symbol by each transmitter consecutively while the other transmitter(s) are inactive. In this manner the receiver may calculate the first column of the above matrix from the training symbol sent by the first transmitter, the second column from the training symbol sent by the second transmitter, and so on. Hence, a system using n transmission paths will require a minimum of n training symbols to recover the constants $h_j$. This training length is a serious problem for high rate wireless packet transmission links, because of the associated overhead which reduces the net data rate. For instance, at 100 Mbps, a 1000 byte packet has a duration of 80 µs. Using the same 4 µs symbol duration as the IEEE 802.11a standard, a system using 4 transmission paths would take a minimum training time of 16 µs, which means a significant overhead of 20%. The training overhead grows with bit rate and number of transmission paths so it partially reduces the benefits of using SDM.

The present invention has inter alia for its object to provide a communication system which the training time may be reduced considerably compared to the above. It is a further object of the invention to provide such a communication system with improved frame detection and frequency synchronization.

SUMMARY OF THE INVENTION

The present invention relates to a communication system comprising first communication means, second communication means and a first transmission path as well as at least one further transmission path between said first and said second communication means, in which at least the first communication means are provided with transmission means for each of said transmission paths, which are capable of sending at least part of a communication signal to the second communication means, in which at least the second communication means comprise reception means for each of said transmission paths, which are capable of receiving at least part of said communication signal, and in which at least the first communication means comprise training means for generating a training code to be sent to the reception means enabling the reception means to match a received signal to a corresponding transmitted signal.

To this end a communication system of the kind described in the above paragraph is according to the invention characterized in that the training means are capable of generating a training code with at least nearly ideal cyclic auto-correlation properties such that its cyclic auto-correlation function is at least nearly zero for all cyclic shifts, in that the transmission means are capable of concurrently sending said training code in a mutually shifted manner and in that the reception means are capable of performing a cyclic auto-correlation with respect to a received training signal. Because of the cyclic auto-correlation properties of the training code applied in accordance with the invention it is achieved that the auto-correlation performed on the received training signal leaves no or hardly no by-products. Instead, with ideal auto-correlation properties, the output of the auto-correlation operation at the reception side will be either $n.h_i$ or zero, where $h_i$ is one of the constants to be estimated and n is a known normalization factor. In fact the auto-correlation properties need not be absolutely ideal but may deviate to a small extent from the ideal situation, leaving sufficient certainty to derive the required constants. Because the transmitters send the training code concurrently in time, the invention, in theory, requires only one training symbol's duration to recover all constants $h_i$.

The auto-correlation operation requires that the training code be multiplied by all itself and by all its cyclic shifts to render the above product. This may be effected by sending not only the training code but also its cyclic shifts to the reception means and multiplying these codes with the training code generated by the reception means. In a preferred embodiment, however, the communication system according to the invention is characterized in that the reception means are capable of generating the cyclic shifts of a received training code and to correlate these with said training code. In this case, only the training code has to be sent and this code as well as all cyclic shifts are generated at the reception side. It not only limits this embodiment transmission time and hence training time, it also avoids any distortion or other noise of the correlation products.

A specific embodiment of the communication system according to the invention is characterized in that the training code comprises a concatenation of the rows of a Fourier matrix. Such a concatenation is generally referred to as a Frank and Zadoff-Chu sequences and happen to have ideal auto-correlation properties. This renders these sequences extremely suitable for use in a communication system in accordance with the present invention.

The length of the training code is preferably equal to the number of connection paths used or a integer multiple thereof.

In yet another specific embodiment, the communication system according to the invention is characterized in that the training code y is derived from a maximal length sequence x with an uneven length L, having an auto-correlation of −1 for all cyclic shifts, such that at least approximately $y=x+j/\omega L$. A maximal length sequence has an auto-correlation of −1 for all cyclic shifts. A sequence of this kind with an uneven length can be modified into the above code y, which is suitable for use in the communication system according to the invention.

In order to deal with possible delay spread of the training signals received by the second communication system, a further embodiment of the communication system according to the invention is characterized in that, during operation, the training codes are preceded and followed by a dummy code. The dummy codes are taken sufficiently long to avoid substantial overlap between the auto correlation output signals during the training stage, so that the constants may be derived unambiguously.

In a further preferred embodiment, the communication system according to the invention is characterized in that the training means comprise a pre-correction filter for processing the training code. A pre-correction filter as used in this embodiment is not absolutely necessary, but without it the reception means generally will have to perform a correction. The additional complexity and possible signal noise may be saved by pre-correcting the training signals before they are sent.

In a further preferred embodiment, the communication system according to the invention is characterized in that the training means comprise storage means for storing one or more training codes. The transmitted training signal can be pre-calculated and stored in memory to avoid the complexity of a separate pre-correction filter which would otherwise be used merely during the training phase. The pre-corrected training codes are for instance stored in a lookup table easily accessible for the training means. During the training stage, these codes merely need to be read out so that no complex circuitry is needed for generation or pre-correction of the codes concerned.

In still a further preferred embodiment of the communication system according to the invention not merely one training code is issued during the training phase but instead the training means, during operation, issue a number of at least substantially identical training codes and in that the receiving means comprise summation means to average the received training codes. By issuing a repetition of training codes and adding the auto-correlation output over time, a significant improvement in signal to noise ratio may be obtained.

The use of a repetitive pattern of the same code as training signal, moreover provides an excellent frame detection trigger. To this end, a further specific embodiment of the communication system according to the invention is characterized in that the training means, at least during operation, issue at least substantial training codes at a substantially fixed interval and in that the reception means are provided with auto correlation means for correlating a received signal with one or more signals received after a delay corresponding to said interval or an integer multiple thereof. Because of the ideal auto-correlation properties of the code, the correlation outputs consist only of the sum of $n_1$ auto-correlation points, whereas all cross-correlation products between signals coming from different transmitters are zero. If there is a valid training signal at the input of the reception means, then the correlator output values are proportional to the total received power on each reception means. The phase of the correlator outputs is equal to $2Bf_oT_c$, where $f_0$ is the frequency offset between transmission means and the reception means and $T_c$ the time interval between successive training codes. After summing all correlator outputs, a start of a frame is detected by looking if the magnitude of the output signal exceeds some threshold. The value of the threshold is a tradeoff between the probability of a false alarm and the detection probability. If a start-of-transmission is detected, then the phase of the summed correlator outputs is a measure for the carrier frequency offset that can be fed to a frequency correction circuit. The frequency offset $f_o$ is given by the output phase divided by $2BT_c$.

BRIEF DESCRIPTION OF THE DRAWINGS

The invention will be described in further detail below along the lines of a specific example and with reference to the accompanying drawings. In the drawings.

Like parts have been given the same reference numerals throughout the figures.

DETAILED DESCRIPTION

Figure 1:
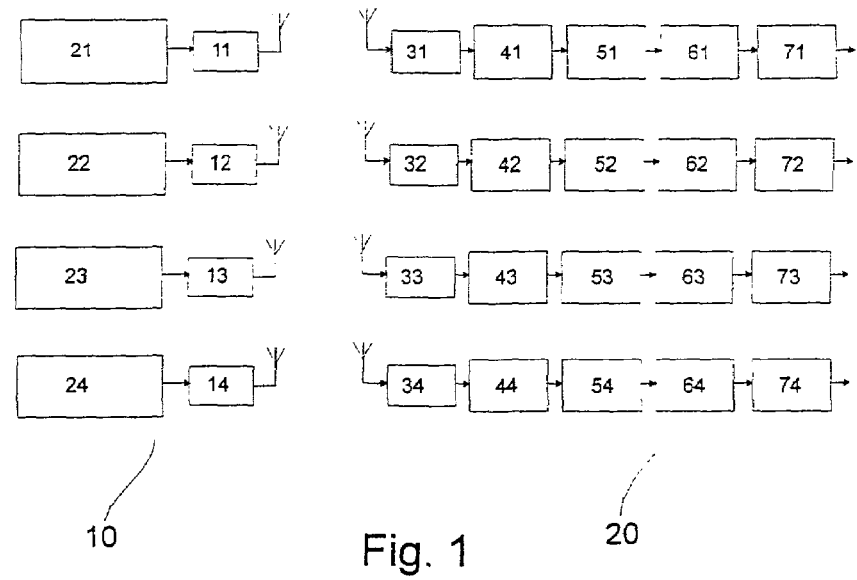
FIG. 1 is a schematic representation of a specific embodiment of a communication system in accordance with the invention.

The communication system depicted in FIG. 1 comprises first communication means 10 with transmission means which are capable of sending a communication signal in a wireless communication network as well as second communication means 20 which comprise reception means which are capable of receiving said communication signal. In this example, the communication means are primarily intended for data exchange and operate based on a TCP/IP or any other suitable packaged data transmission protocol.

Especially with data transmission the finite available bandwidth presents an everlasting limitation. In order to cope with this limitation, several multiplexing techniques have been developed, including space division multiplexing (SDM) as used in this example. According to the technique, the transmission means comprise multiple transmitters 11 . . . 44 which are concurrently used for the transmission of the communication signal over multiple transmission carriers, whereas also multiple reception means 31 . . . 34 are available for receiving the signals sent. The different transmission means 11 . . . 14 and reception means 31 . . . 34 each comprise their own antenna, which is depicted schematically in the drawing. Moreover, a division of the signal over several orthogonal frequency bands is effected in order to further enhance the capacity of the system, generally known as orthogonal frequency division multiplexing (OFDM). The communication system is distributed over the different sub-carriers and frequencies to maximize the data throughput capacity of the connection.

SDM used in wireless data transmission presents a complication in that the signals of the different transmission means 11 . . . 14 will inevitably be received by all reception means 31 . . . 34. For four transmitters 11 . . . 14, like in this example, sending signals $x_1 \ldots x_4$ respectively on a specific sub-carrier, the signals $r_1 \ldots r_4$ received by the different receivers 31 . . . 34 are given by:

$$r_1 = h_1 \cdot x_1 + h_2 \cdot x_2 + h_3 \cdot x_3 + h_4 \cdot x_4$$
$$r_2 = h_5 \cdot x_1 + h_6 \cdot x_2 + h_7 \cdot x_3 + h_8 \cdot x_4$$
$$r_3 = h_9 \cdot x_1 + h_{10} \cdot x_2 + h_{11} \cdot x_3 + h_{12} \cdot x_4$$
$$r_4 = h_{13} \cdot x_1 + h_{14} \cdot x_2 + h_{15} \cdot x_3 + h_{16} \cdot x_4$$

in which $h_{1 \ldots 16}$ represent transmission factors or channel coefficients which take into account the spatial displacement of the different transmitters and receivers as well as different environmental influences giving rise to, for instance, attenuation and distortion of the signal. Because these factors are not known and may change from time to time, they need to be recovered for each data package being sent. This process is generally referred to as channel training and consists of the transmission of a number of known data signals which enable the reception means to recover the transmission factors $h_{1 \ldots 16}$. To this end, the transmission means are equipped with training means 21 . . . 24. Although these training means are indicated separately for all transmitters, they may be shared among the transmitters in order to save circuitry.

The training means may comprise a processor unit capable of calculating the appropriate training signals, but in this example, simply consist of a look-up table which has been filled in advance with suitable training codes. In accordance with the present invention, these training codes are chosen to have at least nearly ideal auto-correlation properties, meaning that their auto-correlation product is zero for all cyclic shifts and non-zero for itself. In this example, the so-called Frank and Zadoff-Chu sequence is taken as training code. A Frank code is obtained by concatenating all rows or columns of a discrete Fourier matrix. The 4 by 4 discrete Fourier matrix F, for example, is given by:

$$F = \begin{bmatrix} 1 & 1 & 1 & 1 \\ 1 & j & -1 & -j \\ 1 & -1 & 1 & -1 \\ 1 & -j & -1 & j \end{bmatrix}$$

By concatenating the rows of this matrix, the following sequence c is obtained having perfect auto-correlation properties:

c={1, 1, 1, 1, 1, j, −1, −j, 1, −1, 1, −1, j, −1, j}

The auto-correlation function of this code renders zero for all its cyclic shifts and equals 16 for the non-shifted auto-correlation. In this example, use is made of a code c with a length (16) equal to an integer multiple (4) of the number of sub-carriers (4).

The same training code c is supplied to all transmitters 11 . . . 14, but in a cyclically shifted fashion. This means that, for instance, the first transmitter 11 transmits the original code c, the second transmitter 12 transmits the code cyclically shifted over one digit, the third transmitter 13 transmits the code c shifted over two digits, and so on. In order to compensate for any distortion during transmission, a pre-correction filter is applied to the code c so that its spectrum will be the same as that of the OFDM signal. It is not absolutely necessary to add a pre-correction but, without it, the receivers need to make a correction which would make the channel estimates more noiser for sub-carriers corresponding to low code spectral values of the transmitted code. The corrected training signal is precalculated and stored in the look-up table of the training means 21 . . . 24 to avoid the complexity of a separate pre-correction filter which would otherwise only be used for the training phase.

The second communication means 20 comprise separate receivers 31 . . . 34 with associated antennas for all transmitters 11 . . . 14 of the first communication means 10. These receivers 31 . . . 34 will each receive the training codes c coming from all transmitters 11 . . . 14. The receivers are each coupled to correlation means 41 . . . 44 which perform a cyclic correlation of the code c with part of the signal received by the associated receiver 31 . . . 34 of a length equal to the code c. If the training length is more than twice the code length, then the receivers 31 . . . 34 first sum or average an integer number of parts of the training signal with a length equal to that of the code c. The averaged signal is then used to perform the cyclic correction. Because of the ideal cyclic auto-correlation properties of the training code c, as used in the communication system according to the invention, at all times, only the signal of one of the transmitters 11 . . . 14, matching the code at that time applied by the cyclic correlation means 41 . . . 44, will deliver a non-zero output whereas the signals received from the other transmitters will be cancelled. By cyclically shifting the code c, all coefficients may be recovered in this manner, one after the other.

Figure 2:
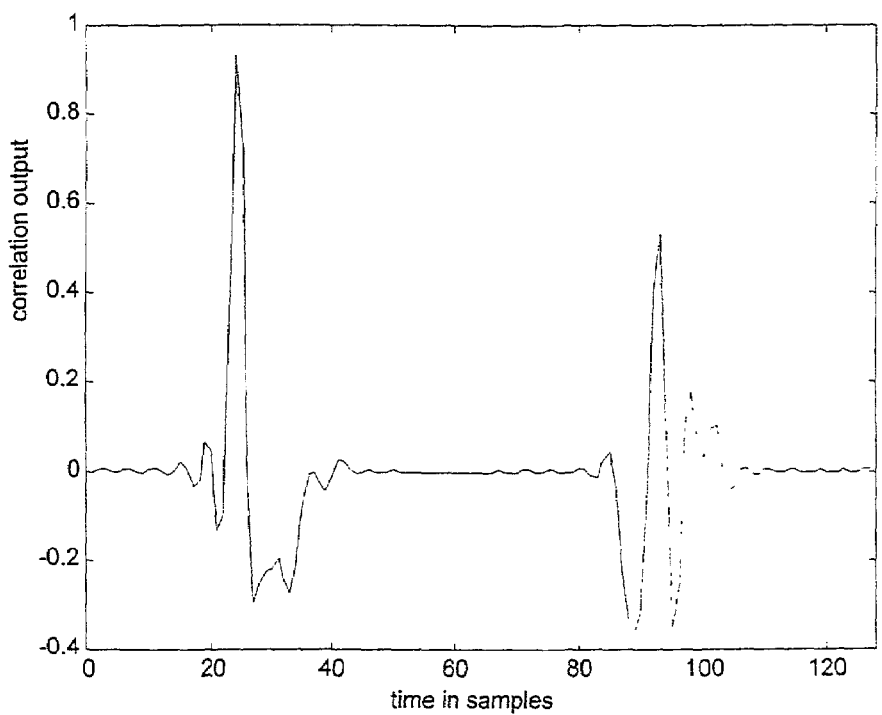
FIG. 2 is the in phase part of the correlation output of a receiver upon reception of a training signal within the system of FIG. 1 for two transmit antennas.

FIG. 2 shows an example of the cyclic correlation output for two transmitters. The cyclic correlation output shows separate impulse responses for different transmission antennas, which are separated by a delay equal to the cyclic shift applied in the subject transmitter. The code in this example is a length 64 Frank sequence that is two times over sampled, so there are 128 samples in one code length. All receivers will see a different cyclic correlation function from which they can extract the channel information.

Figure 3:
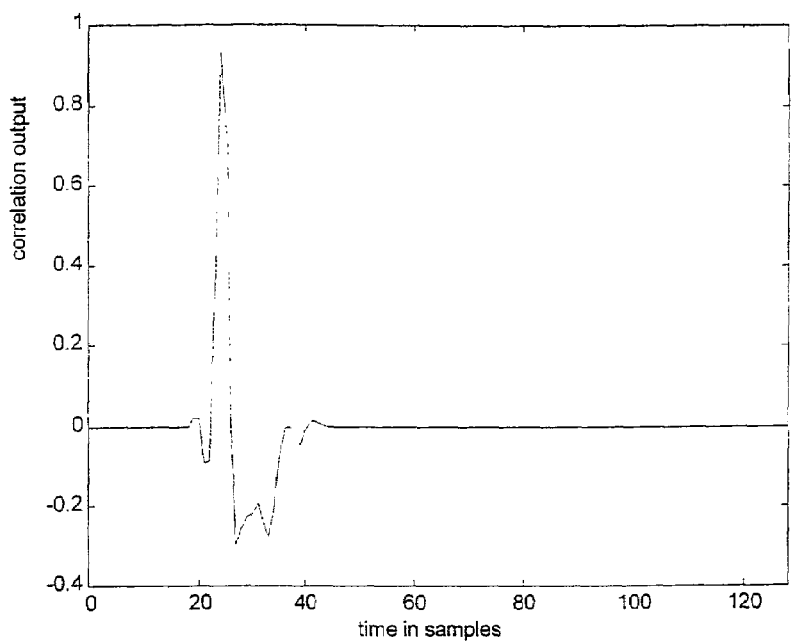
FIG. 3 is the windowed correlation output of FIG. 2.

To estimate a specific channel coefficient $h_j$ the reception means comprise a filter 51 . . . 54 which isolates the impulse response of the subject transmitter by multiplying the cyclic correlation output of the correlator 41 . . . 44 by a window function which is non-zero only at the desired impulse response. The window has smooth roll-off regions in order to minimize errors in the estimated channel frequency response. The roll-off factor is a compromise between frequency leakage and delay spread robustness; a larger roll-off region gives less frequency leakage but it also attenuates more impulse response components whose path delays fall within the roll-off region. FIG. 3 shows an example of a windowed correlation function based on the correlator output shown in FIG. 2.

Figure 4:
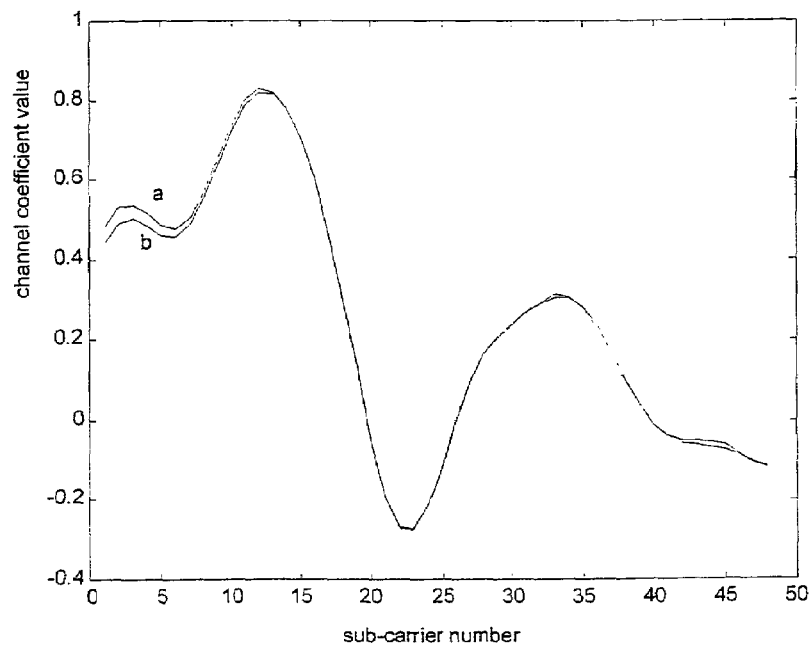
FIG. 4 is the in phase channel coefficient for different sub-carriers, both estimated and actual, in the system of FIG. 1.

The windowed impulse response, taken at the output of the filter 51 . . . 54, is cyclically shifted back by a second correlator 61 . . . 64 to compensate for the cyclic shift applied to the transmitter. Finally, the channel frequency response is found by calculating a Fast Fourier Transform (FFT) over the windowed impulse response, taken at the output of the second correlator 61 . . . 64. To this end, the reception means comprise a FFT-filter 71 . . . 74. The FFT-filter 71 . . . 74 outputs resemble the channel coefficient values of all OFDM sub-carriers for one particular transmitter-receiver pair. The estimated channel frequency response for all sub-carrier is drawn as curve a in FIG. 4, whereas curve b represents the actual values. At the lower sub-carriers, there is minor difference with the actual channel frequency response, which is assumed to be introduced by the windowing operation of the first filter 51 . . . 54.

Although the system of this example uses OFDM together with SDM, the invention may as well be used for SDM on its own, i.e. with merely a single carrier. If peak power is limited, which is often the case, then single carrier SDM training might require a separate training signal per transmit antenna instead of a common signal source. The training signal has to be long enough to get sufficient signal-to-noise ratio (SNR) at the receiver. Instead of sending separate training signals over the antennas one by one, one long the training signal may then be transmitted simultaneously on all antennas. In the receiver, the same procedure outlined above can be followed up to the cyclic correlation. The outputs of the cyclic correlation directly resemble the desired channel coefficients that are needed for a single carrier SDM receiver.

Theoretically, the training time need not be longer than the duration of the training code c. In practice however, a repetition of the training code is used in order to realize sufficient SNR at the receiver's end. Moreover, in order to deal with inevitable delay spread, the code c is preferably extended with a small dummy code preceding and following it. The addition of said dummy codes ascertains that the impulse responses associated with the different transmitters do not overlap mutually. This extended code is then stored in the look-up table of the training means 21 . . . 24. Even with this extension, the total training time need not be much longer than the duration of a training signal with sufficient SNR, whereas the prior art systems all require a multiple thereof.

Figure 5:
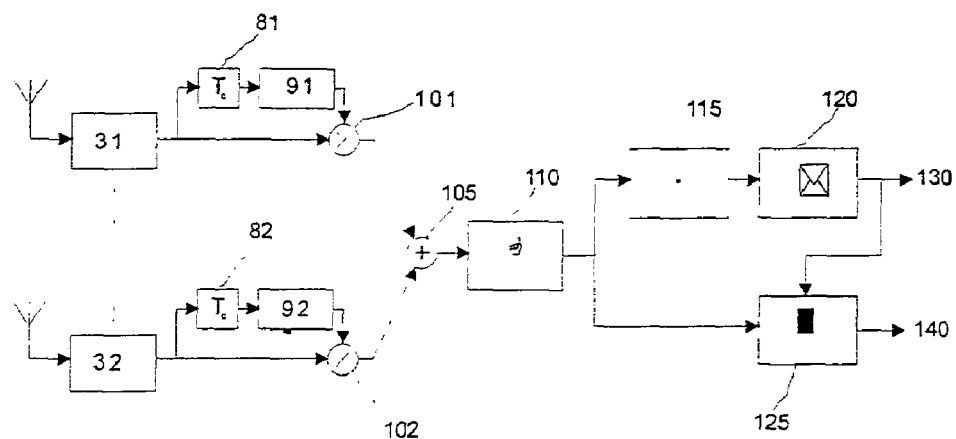
FIG. 5 is a first embodiment of a frame detection and frequency synchronization circuit for use in a communication system according to the invention.

The fact that, in a communication system according to the invention, the training signal consists of a repetitive pattern with at least nearly ideal auto-correlation properties may also advantageously be used for frame detection and the detection of the carrier frequency offset. FIG. 5 shows a block diagram of a system that detects the start of a transmission and that estimates the carrier frequency offset in a communication system like that of FIG. 1 but with two transmitters and receivers. For each receiver 31, 32, the reception means comprise delay means 81, 82 to add a delay time $T_c$ to the received signal, where $T_c$ is equal to the duration of the training code c, and conversion means 91, 92 to convert the delayed signal to a conjugated replica of it. This $T_c$ seconds delayed and conjugated replica is fed to correlation means 101, 102. Because of the ideal auto-correlation properties of the code c, the correlation outputs consist only of the sum of $n_t$ auto-correlation points, whereas all cross-correlation products between signals coming from other transmitters are zero.

If there is a valid training signal at the input of the receivers, then the correlator output values are proportional to the total received power on each receiver. The phase of the correlator outputs is equal to $2B.f_o.T_c$, where $f_o$ is the frequency offset between transmitter and receiver. If all transmitters and receivers from one SDM terminal share the same reference oscillator, only a single frequency offset has to be estimated and corrected. The correlator outputs are added at 105 and fed to summation means 110 to average the total in time. A start of a frame is detected by means of a comparator 120 which detects whether the magnitude of the absolute value 115 of the output signal of the summation means 110 exceeds some threshold *. The value of the threshold * is a tradeoff between the probability of a false alarm and the detection probability. If a start-of-transmission is detected, a trigger is raised at the output 130 of the circuit and at the same time the actual phase v of the summed correlator outputs is a measure for the carrier frequency offset. The frequency offset $f_o$ is given by the output phase v divided by $2B.f_o.T_c$ and may be derived at the output 140 of calculation means 125 in order to be fed to a frequency correction circuit.

Figure 6:
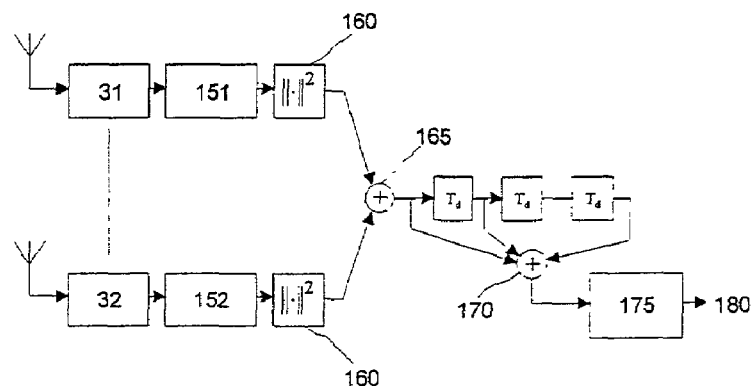
FIG. 6 is a second embodiment of a frame detection and frequency synchronization circuit for use in a communication system according to the invention.

FIG. 6 shows a block diagram of an SDM synchronization system that finds the symbol timing based on knowledge of the transmitted training codes c. Each of the received signals is passed through a matched filter 151, 152 with an impulse response equal to the conjugated and time-reversed code c. Hence, the matched filter output shows the correlation between the received signal and c. As there is no knowledge of the carrier phase at this stage, the power of the correlation outputs is calculated by taking the square of the output value with suitable means 160. The power outputs of all receivers are added at 165 to improve the signal-to-noise ratio (SNR) of the detector output. A further SNR enhancement is obtained by adding signal components which are spaced apart by $T_d$ seconds 170, where $T_d$ is equal to the cyclic time shift applied to the codes c in the SDM transmitters. The eventual output is fed to comparator 175 which selects the largest peak. The occurrence of this peak is a trigger that can be used for symbol timing.

Figure 7:
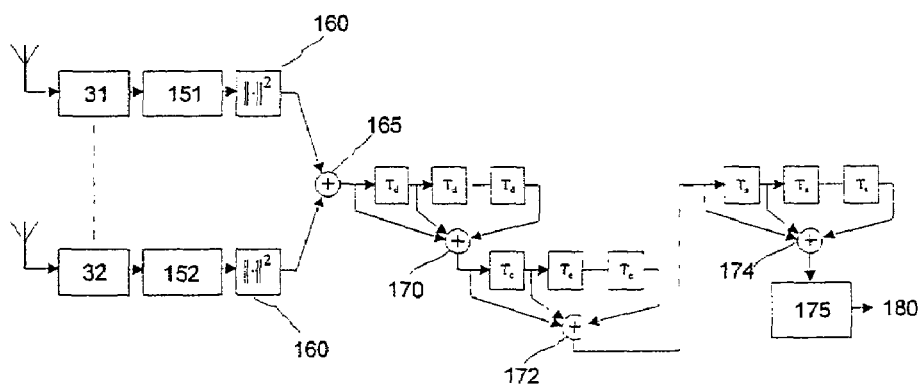
FIG. 7 is a third embodiment of a frame detection and frequency synchronization circuit for use in a communication system according to the invention.

Besides adding and averaging the training signals of multiple transmitters and receivers, moreover averaging over several training codes is possible to further enhance the SNR. To this end, an additional Finite Impulse Response (FIR) filter 172 is added to the circuit of FIG. 6 that adds samples which are spaced apart by multiple code lengths of $T_c$ seconds, see FIG. 7. As the training signal consists of a repetition of the same code c, this further improves the SNR. The circuit of FIG. 7, moreover, comprises an extra FIR filter 174 that sums over multiple multipath components with a spacing of one sample interval $T_s$. The number of taps L of this last FIR filter should preferably be such that L. $T_s$ is equal to the maximum tolerable delay spread that the receiver can tolerate. This structure gives an enhanced SNR performance in the case of multipath fading channels. In addition, it improves the maximum tolerable delay spread.

Although the invention has been described in further detail with reference to merely a number of embodiments, it will be appreciated that the invention is by no means limited to the examples given. On the contrary a skilled person will be able to arrive at numerous different embodiments and variation without departing from the scope and spirit of the present invention. As such he may avail himself of other codes with ideal or nearly ideal cyclic auto-correlation properties to be used as training codes. Besides the aforementioned Frank and Zadoff-Chu sequences, for instance maximum length sequences, having an auto-correlation of −1 for all cyclic shifts, may be used as a basis of such an alternative code.

What is claimed is:

1. A communication system having first communication means, second communication means and a first transmission path as well as at least one further transmission path between said first and said second communication means, in which at least the first communication means are provided with transmission means for each of said transmission paths, which are capable of sending at least part of a communication signal to the second communication means, in which at least the second communication means comprise reception means for each of said transmission paths, which are capable of receiving at least part of said communication signal, wherein the first communication means comprises:

a training generator that generates a training code to be sent to the reception means enabling the reception means to match a received signal to a corresponding transmitted signal, wherein the training generator is capable of generating a training code with at least nearly ideal cyclic auto-correlation properties such that its cyclic auto-correlation function is at least nearly zero for all cyclic shifts, in that the transmission means are capable of concurrently sending said training code in a mutually shifted manner and in that the reception means are capable of performing a cyclic auto-correlation with respect to a received training signal.

2. Communication system according to claim 1, wherein the reception means are capable of generating the cyclic shifts of a received training code and to correlate these with said training code.

3. Communication system according to claim 1, wherein the training code comprises a concatenation of the rows of a Fourier matrix.

4. Communication system according to claim 3, wherein the training code has a length which is equal to the number of transmission paths or an integer multiple thereof.

5. Communication system according to claim 1, wherein the training codes are preceded and followed by a dummy code during operation.

6. Communication system according to claim 1, wherein the training generator comprises a pre-correction filter for processing the training codes.

7. Communication system according to claim 1, wherein the training generator comprises storage means for storage one or more training codes.

8. Communication system according to claim 1, wherein the training generator during operation, issue a number of at least substantially identical training codes and in that the receiving means comprise summation means to average the received training codes.

9. Communication system according to claim 1, wherein the training generator at least during operation, issue at least substantial training codes at a substantially fixed interval and in that the reception means are provided with auto-correlation means for correlating a received signal with one or more signals received after a delay corresponding to said interval or an integer multiple thereof.

* * * * *